(No Model.)
T. A. & W. T. JEBB.
METHOD OF AND APPARATUS FOR MANUFACTURING DISTILLED SPIRITS FROM GRAIN.
No. 276,046. Patented Apr. 17, 1883.
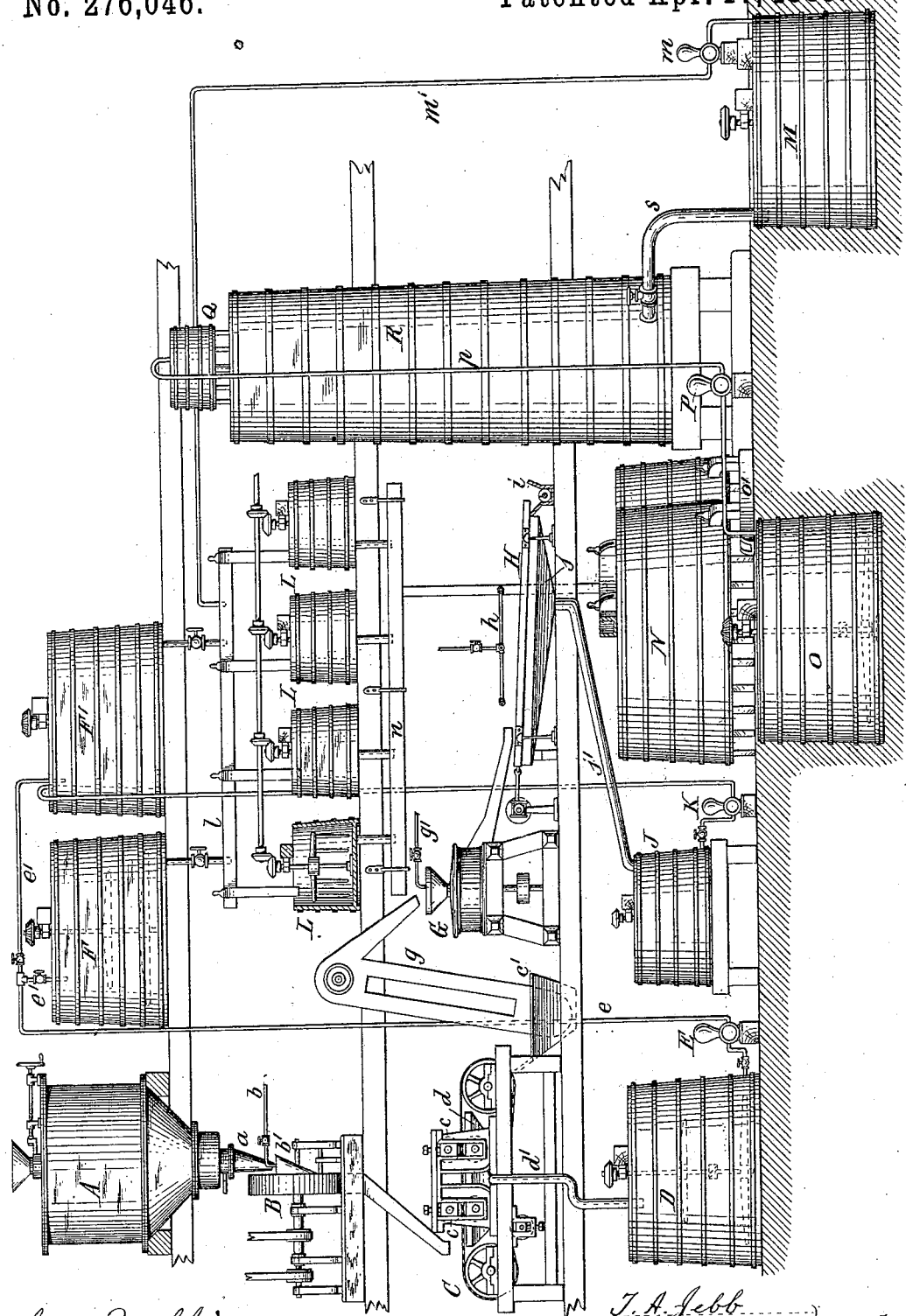

UNITED STATES PATENT OFFICE.

THOMAS A. JEBB AND WILLIAM T. JEBB, OF BUFFALO, NEW YORK.

METHOD OF AND APPARATUS FOR MANUFACTURING DISTILLED SPIRITS FROM GRAIN.

SPECIFICATION forming part of Letters Patent No. 276,046, dated April 17, 1883.

Application filed March 10, 1883. (No model.)

*To all whom it may concern:*

Be it known that we, THOMAS A. JEBB and WILLIAM T. JEBB, of the city of Buffalo, in the county of Erie and State of New York, have invented new and useful Improvements in Method of and Apparatus for Manufacturing Distilled Spirits from Grain, of which the following is a specification.

This invention relates more particularly to an improvement in the manufacture of distilled spirits from grain by the sour-mash process, in which the mash is prepared by the addition to the mashed material of a certain quantity of slops derived from a previous distillation, and in which the mashed material is subjected during a suitable period of time to the converting action of the slops.

The object of the present invention is more particularly to produce by the sour-mash process spirits which are pure and free from fusel-oil and other deleterious substances which result from the presence of the husks or outer coating of the grain during the processes of mashing, fermenting, and distilling. In the sour-mash process as generally practiced the crushed or ground grain is mashed with a certain quantity of slops, and the mash, after having been subjected to the converting action of the slops a certain period of time, is fermented, and the resulting spirits are distilled off. The fusel-oil and other impurities or deleterious substances which are contained in or liberated from the outer portions or husks of the kernels of grain are in this process carried over with the spirits, and have to be removed therefrom by rectifying and aging.

The object of our invention is to prevent as much as possible the formation or liberation of fusel-oil and other deleterious substances or impurities during the process of manufacture; and our invention consists, to that end, principally in crushing, grinding, or otherwise reducing the grain, then separating the spirit-producing portions of the grain from the husks or bran, then mashing the spirit-producing portions of the grain together with a suitable quantity of slops, then fermenting the mash so prepared, and finally distilling off the spirits from the fermented material, whereby the presence of the husks or outer covering of the kernels of grain during the operations of fermenting and distilling is avoided, and the liberation of the deleterious substances and their admixture with the ultimate product is prevented.

Our invention also consists of the apparatus which is employed in practicing our improved process, as will be hereinafter fully set forth, and pointed out in the claims.

The accompanying drawing represents such apparatus as may be employed in carrying out our invention.

A represents a steeping tank or vat, in which the grain to be worked up is soaked and prepared for reduction. This steeping-tank is preferably constructed as described and shown in Letters Patent of the United States No. 240,907, dated May 3, 1881, granted to us; but any other suitable construction may be adopted, if desired.

B represents a disintegrating-machine, in which the steeped grain is crushed so as to reduce the inner starchy portions of the grain to a comparatively fine state, while the outer husks or bran are broken into large flakes, which can be readily separated from the finer comminuted inner portions. This disintegrating-machine consists preferably of a number of concentric cages or circular rows of beaters revolving in opposite directions, so that the kernels of grain are coarsely broken rather than ground; but a crushing or grinding mill may be employed for the purpose, if desired. The disintegrating-mill is arranged below the discharge-spout $a$ of the steeping-tank A, and is provided with a water-supply pipe $b$, through which a stream of water is conducted into the feed-hopper $b'$, so that the grain is reduced in the presence of water, whereby the operation is greatly facilitated.

C represents a separating-machine whereby the spirit-producing portions of the material derived from the disintegrating-machine B are separated from the husks or bran. The separating-machine C consists preferably of a perforated endless apron which passes between suitable pressure-rollers, $c$, whereby the fine material is driven through the meshes of the perforated apron, while the coarse material, composed principally of husks or bran, is discharged over the tail of the endless apron into a receiving-hopper, $c'$. Two or more pairs of pressure-rollers, $c$, are preferably employed, so that the pressure can be graduated, the second pair being set closer together than the preceding pair. The fine separated material which passes through the meshes of the endless apron is collected in a receptacle, d, arranged below the upper portion of the endless apron, and conducted by a pipe, d', to a receiving tank or vat, D, which latter may be provided with a suitable stirrer or agitating device, whereby the material is prevented from settling. The material which is delivered into the tank D is liquid; but, if necessary, it may be further diluted in the tank D by the admission of water.

E represents a pump by which the material collected in the tank D is forced into one or more receiving-tanks, F F', preferably arranged on one of the upper floors of the building, the force-pipe e of the pump being provided with suitable branch-pipes, e', which are controlled by suitable valves or stop-cocks, so that the material can be directed into either of the tanks F F' at desire.

G represents a grinding-mill or other reducing-machine, which receives the tailings from the separating-machine C, and further reduces the same in order to extract therefrom all the spirit-producing portions of the grain which may still adhere to the fragments of the husks or be commingled therewith.

g represents an elevator, which conveys the tailings from the receptacle c' to the feed-hopper of the mill G. The latter is provided with a water-pipe, g', through which a stream of water is directed into the feed-hopper.

H represents a separating-machine, which receives the ground material from the mill G and effects a separation of the fine material from the fragments of husks or bran. This separating-machine consists preferably of a vibrating sieve covered with bolting-cloth, upon which streams of water are delivered from perforated pipes h, whereby the fine starchy material is washed through the meshes of the bolting-cloth, while the coarse husks or bran escapes over the tail of the sieve and falls into a conveyer-trough, i. The tailings of this separation may be used wet for feed; or, if they are to be shipped, they are preferably deprived of their moisture by pressure in a hydraulic or other suitable press, or by drying in a suitable kiln, or by both. The fine material which passes through the meshes of the bolting-cloth is collected in a receptacle, j, underneath the sieve and conducted by a pipe, j', into a receiving-tank, J, which may be provided with a suitable stirrer or agitator.

K represents a pump, which forces the material from the tank J into the receiving-tank F'.

L represents one or more mash-tubs, of suitable size, adapted to receive the material from the receiving-tanks F F', suitable pipes or conduits being provided, as shown at l, whereby the contents of the two tanks F F' can be directed into either of the mash-tubs L. If desired, the receiving-tanks F F' may be dispensed with and the material may be delivered directly from the receiving-tanks D and J to the mash-tubs L. The material from the the tubs D and J may be mashed separately, or both batches may be mixed in the receiving-tubs F F' and be mashed together, as may be preferred. The mash-tubs may be provided with revolving rakes or agitators, if desired.

M represents the slop-vat, and m a pump whereby the slops are delivered through a pipe, m', into a conduit which leads to the several mash-tubs L, so that a suitable quantity of slops can be added to the mash in either of the tubs L.

n represents a pipe or trough through which the mash is conducted from the mash-tubs L to the fermenting-tubs N, which are preferably located on the ground floor, and in which the material is fermented in the usual manner.

O represents the beer cistern or receiver, which receives the fermented material in the tubs N through a trough or conduit, o'.

P is a beer-pump, which forces the beer from the cistern O by a pipe, p, into the charger Q, located above the still R.

s represents a pipe through which the slops are delivered from the still R into the vat M.

It will be observed from the foregoing that the material which is delivered into the mash-tubs and then mixed with the slops from the vat M is substantially free from husks or bran, and that the latter ingredients are not present during the processes of mashing, fermenting, and distilling, and that consequently the slops which are supplied to the mash-tubs L are also free from husks or bran. The operations of mashing, fermenting, and distilling are therefore carried on exclusively with the spirit-producing constituent parts of the grain, to the exclusion of those constituent parts of the grain from which fusel-oil and other deleterious substances are generated or liberated in the ordinary method of manufacturing distilled spirits, and the spirits produced by our improved method are therefore substantially pure and free from these deleterious substances. The bulk of the material which is mashed, fermented, and distilled is also greatly reduced by the separation therefrom of the bran or husks of the grain, and the yield of spirits is increased as the absorption of a portion of the spirits by the husks or bran is avoided. A small quantity of small grains may be added to the mash in the mash-tubs, if desired.

The accompanying drawing represents an arrangement of appliances whereby our improved process may be practiced; but the particular form, construction, or arrangement of the several devices is not material and may be altered without departing from the spirit of our invention.

We claim as our invention—

1. The herein-described method of producing pure distilled spirits from grain, which consists in first separating the spirit-producing constituent parts of the grain from the husks or bran, then mashing the separated spirit-producing constituent parts together with slops derived from a previous distillation, and then fermenting the mash and distilling the fermented beer, substantially as set forth.

2. The herein-described method of producing pure distilled spirits from grain, which consists in steeping the grain, then reducing the steeped grain, then separating the fine portions of the reduced material from the coarse bran or husks, then mashing the separated fine portions together with slops derived from a previous distillation, then fermenting, mashing, and distilling the fermented beer, substantially as set forth.

3. In an apparatus for producing pure distilled spirits from grain, the combination of a reducing-machine whereby the grain is reduced to the proper degree of fineness, a separating-machine whereby the fine material is separated from the coarse bran or husks, a mash-tub in which the separated fine material is mashed, a slop-vat and mechanism whereby the slops are delivered into the mash-tub, a fermenting-tub in which the mash is fermented, and a still in which the fermented beer is distilled, substantially as set forth.

4. In an apparatus for producing pure distilled spirits from grain, the combination of a reducing-machine whereby the grain is coarsely broken, a separating-machine whereby the fine portions of the broken grain are separated from the coarse bran or husks, a secondary reducing-machine whereby the coarse material of the first separation is reground, a separating-machine whereby the fine portions of the reground material are separated from the coarse portions thereof, a mash tub or tubs in which the fine material derived from both separations is mashed, a slop-vat and means whereby the slops are delivered into the mash tub or tubs, a fermenting-tub in which the mash is fermented, and a still in which the fermented beer is distilled, substantially as set forth.

T. A. JEBB.
WILLIAM T. JEBB.

Witnesses:
JOHN TULLY,
R. L. STANTON.